United States Patent
Horikoshi et al.

(10) Patent No.: US 7,601,773 B2
(45) Date of Patent: Oct. 13, 2009

(54) ROOM TEMPERATURE-CURABLE, HEAT-CONDUCTIVE SILICONE RUBBER COMPOSITION

(75) Inventors: Jun Horikoshi, Tano-gun (JP); Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/873,929

(22) Filed: Oct. 17, 2007

(65) Prior Publication Data

US 2008/0096030 A1 Apr. 24, 2008

(30) Foreign Application Priority Data

Oct. 18, 2006 (JP) .............................. 2006-283764

(51) Int. Cl.
*C08K 3/08* (2006.01)
(52) U.S. Cl. ...................... 524/439; 428/447; 524/440; 524/441; 524/444; 524/588; 528/10; 528/33; 528/34; 156/329; 252/500; 252/512; 252/514
(58) Field of Classification Search ................ 428/447; 524/439, 440–441, 444, 588; 528/10, 33–34; 252/500, 512, 514; 156/329
See application file for complete search history.

(56) References Cited

U.S. PATENT DOCUMENTS 5,931,222 A * 8/1999 Toy et al. ................... 165/80.3
6,534,581 B1 * 3/2003 Kleyer et al. ................ 524/379
6,884,314 B2 * 4/2005 Cross et al. ................. 156/329
2003/0164223 A1 * 9/2003 Cross et al. ................. 156/329

FOREIGN PATENT DOCUMENTS

EP 0 032 050 A2 7/1981
JP 47-32400 11/1972

* cited by examiner

*Primary Examiner*—Randy Gulakowski
*Assistant Examiner*—Olatunde S Ojurongbe
(74) *Attorney, Agent, or Firm*—Oblon, Spivak, McClelland, Maier & Neustadt, L.L.P.

(57) ABSTRACT

Provided is a room temperature-curable, heat-conductive silicone rubber composition, including: (A) a diorganopolysiloxane with both molecular chain terminals blocked with hydroxyl groups and/or organooxy groups, (B) a heat-conductive filler other than a palladium powder, (C) an organosilane containing two or more hydrolyzable groups, and/or a partial hydrolysis-condensation product thereof, and (D) a palladium powder. The composition improves on the drawbacks of the conventional technology, is able to suppress the quantity of hydrogen gas produced from the heat-conductive filler, exhibits superior storage properties, and yields a low-hardness cured product upon curing. The cured product is useful as a heat-conductive material for a heat-generating electronic component.

14 Claims, No Drawings

ROOM TEMPERATURE-CURABLE, HEAT-CONDUCTIVE SILICONE RUBBER COMPOSITION

BACKGROUND OF THE INVENTION

1. Field of the Invention

The present invention relates to a room temperature-curable, heat-conductive silicone rubber composition that is able to suppress the quantity of hydrogen gas produced from the heat-conductive filler, and exhibits superior storage properties.

2. Description of the Prior Art

Heat-generating components such as power transistors and thyristors suffer from a deterioration in their properties as a result of heat generation, and conventionally, when these types of components are installed, countermeasures such as attaching a heat sink to the component to disperse the heat, or allowing the heat to escape into the metal chassis of the instrument have been employed. In such cases, in order to improve the electrical insulation properties and the thermal conductivity, a heat-dissipating, insulating sheet comprising a silicone rubber containing a heat-conductive filler is generally used between the heat-generating component and the heat sink.

As an example of the heat-dissipating, insulating material, patent reference 1 discloses an insulating composition comprising 100 parts by mass of a synthetic rubber such as a silicone rubber blended with 100 to 800 parts by mass of at least one metal oxide selected from the group consisting of beryllium oxide, aluminum oxide, hydrated aluminum oxide, magnesium oxide, and zinc oxide.

Furthermore, as an example of a heat-dissipating material that can be used in locations that do not require insulation, patent reference 2 discloses a composition comprising an addition-curable silicone rubber composition blended with 60 to 500 parts by mass of a silica and a heat-conductive powder such as copper, silver, gold or silicon.

However, the level of integration within electrical devices such as personal computers, word processors and CD-ROM drives continues to increase, and the quantity of heat generated by the integrated circuit elements such as LSI and CPU units within these devices has also increased, meaning conventional cooling methods are sometimes no longer adequate. Particularly in the case of portable notebook computers, because the space inside the device is restricted, large heat sinks or cooling fans cannot be fitted. In these types of devices, the integrated circuit elements are mounted on a printed substrate, and because a material with poor thermal conductivity such as a glass-reinforced epoxy resin or polyimide resin or the like is used as the substrate material, the conventional method of allowing the heat to escape into the substrate via a heat-dissipating, insulating sheet cannot be used.

Accordingly, a liquid-type silicone rubber composition is used. An addition-curable (heat-curable) silicone rubber composition requires the use of a heating device during curing, but the limited heat resistance of the integrated circuit elements means that heating cannot be conducted at high temperatures of 60° C. or higher, and the introduction of a heating device also requires additional investment in equipment. Furthermore, because the produced device is used at room temperature following heat curing, strain (stress) is exerted on the integrated circuit elements.

Furthermore, even in those cases where a condensation-curable (room temperature-curable) silicone rubber composition is used, if a large quantity of a heat-conductive filler is blended into the composition to improve the thermal conductivity, then the hardness level following curing of the silicone rubber composition tends to be overly high, which can also exert strain (stress) on the integrated circuit elements.

In order to increase the thermal conductivity of these types of heat-conductive silicone rubber compositions without increasing the hardness, copper powder or silver powder may be used as the heat-conductive filler, but because these heat-conductive fillers are extremely expensive, the resulting silicone rubber composition product is also very expensive. As a result, large numbers of silicone rubber compositions that use comparatively cheap aluminum powder have been developed. However, because of its reactivity, aluminum powder tends to generate hydrogen gas in the presence of acidic components, alkaline components, or moisture or the like.

If hydrogen gas is generated from a heat-conductive silicone rubber composition, then large quantities of gas bubbles derived from the hydrogen gas are formed within the composition, which can cause swelling or breakage of the container used for storing the heat-conductive silicone rubber composition.

On the other hand, palladium is widely known to have a property of adsorbing hydrogen gas.

[Patent Reference 1] JP 47-32400 A

[Patent Reference 2] EP 0 032 050 A2

SUMMARY OF THE INVENTION

The present invention has an object of providing a room temperature-curable, heat-conductive silicone rubber composition that improves on the drawbacks of the conventional technology, is able to suppress the quantity of hydrogen gas produced from the heat-conductive filler, exhibits superior storage properties, and yields a low-hardness cured product upon curing.

As a result of intensive investigation aimed at achieving the above object, the inventors of the present invention discovered that by using a heat-conductive filler together with a palladium powder, a room temperature-curable, heat-conductive silicone rubber composition with superior storage properties that yields a low-hardness cured product upon curing could be obtained, and they also discovered that this composition was ideal as a heat-dissipating material, and were therefore able to complete the present invention.

Accordingly, a first aspect of the present invention provides a room temperature-curable, heat-conductive silicone rubber composition, comprising:

(A) 100 parts by mass of an organopolysiloxane represented by a general formula (1) shown below:

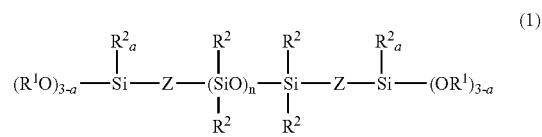

(wherein, each $R^1$ represents, independently, a hydrogen atom, or an unsubstituted or substituted monovalent hydrocarbon group, $R^2$ represents identical or different, unsubstituted or substituted monovalent hydrocarbon groups, each Z represents, independently, an oxygen atom or a bivalent hydrocarbon group, a represents 0, 1 or 2, and n represents an integer of 10 or greater), (B) 10 to 4,000 parts by mass of a heat-conductive filler other than a palladium powder, (C) 1 to 50 parts by mass of an organosilicon compound represented by a general formula (2) shown below:

$$R^3{}_b SiX_{4-b} \quad (2)$$

(wherein, $R^3$ represents an unsubstituted or substituted monovalent hydrocarbon group, X represents identical or different hydrolyzable groups, b represents 0, 1 or 2, and when b=2, the $R^3$ groups may be identical or different), and/or a partial hydrolysis-condensation product thereof, and (D) 0.001 to 40 parts by mass of a palladium powder.

A second aspect of the present invention provides a cured product obtained by curing the above composition.

A third aspect of the present invention provides a method for conducting heat away from a heat-generating electronic component to a heat-dissipating member, comprising the step of sandwiching the above cured product between the heat-generating electronic component and the heat-dissipating member.

A fourth aspect of the present invention provides an electronic device comprising a heat-generating electronic component, a heat-dissipating member, and the above cured product sandwiched between the heat-generating electronic component and the heat-dissipating member.

According to the present invention, a room temperature-curable, heat-conductive silicone rubber composition can be provided that improves on the drawbacks of the conventional technology, is able to suppress the quantity of hydrogen gas produced from the heat-conductive filler, exhibits superior storage properties, and yields a low-hardness cured product upon curing.

DETAILED DESCRIPTION OF THE PREFERRED EMBODIMENTS

A more detailed description of the present invention is presented below.

[Component (A)]

The component (A), which constitutes the base component (the main component) of the room temperature-curable, heat-conductive silicone rubber composition of the present invention, is an organopolysiloxane represented by the general formula (1) shown below:

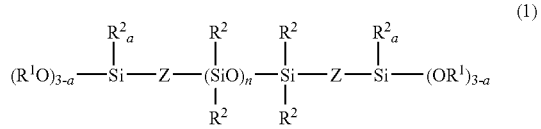

(wherein, each $R^1$ represents, independently, a hydrogen atom, or an unsubstituted or substituted monovalent hydrocarbon group, $R^2$ represents identical or different, unsubstituted or substituted monovalent hydrocarbon groups, each Z represents, independently, an oxygen atom or a bivalent hydrocarbon group, a represents 0, 1 or 2, and n represents an integer of 10 or greater). The organopolysiloxane of the component (A) may use either a single compound, or a combination of two or more different compounds.

Each $R^1$ in the above formula (1) represents, independently, a hydrogen atom, or an unsubstituted or substituted monovalent hydrocarbon group. In those cases where $R^1$ represents an unsubstituted or substituted monovalent hydrocarbon group, examples of suitable groups include unsubstituted or substituted monovalent hydrocarbon groups of 1 to 6, and preferably 1 to 4, carbon atoms, and specific examples include alkyl groups such as a methyl group, ethyl group or propyl group; halogenated hydrocarbon groups such as a chloromethyl group, trichloropropyl group or trifluoropropyl group; cyanated hydrocarbon groups such as a 2-cyanoethyl group, 3-cyanopropyl group or 2-cyanobutyl group; alkenyl groups such as a vinyl group, allyl group or isopropenyl group; and a phenyl group. In those cases where a is either 0 or 1, an unsubstituted or substituted monovalent hydrocarbon group is preferred, and a methyl group or ethyl group is particularly desirable. In those cases where a is 2, a hydrogen atom is preferred.

$R^2$ in the above formula (1) is preferably an unsubstituted or substituted monovalent hydrocarbon group of 1 to 15, and even more preferably 1 to 10, carbon atoms, and specific examples of suitable groups include alkyl groups such as a methyl group, ethyl group, propyl group, isopropyl group, butyl group, 2-ethylbutyl group or octyl group; cycloalkyl groups such as a cyclohexyl group or cyclopentyl group; alkenyl groups such as a vinyl group or allyl group; aryl groups such as a phenyl group, tolyl group, xylyl group, naphthyl group, biphenylyl group or phenanthryl group; aralkyl groups such as a benzyl group or phenylethyl group; halogenated hydrocarbon groups such as a chloromethyl group, trichloropropyl group, trifluoropropyl group, bromophenyl group or chlorocyclohexyl group; and cyanated hydrocarbon groups such as a 2-cyanoethyl group, 3-cyanopropyl group or 2-cyanobutyl group, and of these, a methyl group, vinyl group, phenyl group or trifluoropropyl group is preferred, and a methyl group is particularly desirable.

Each Z in the above formula (1) represents, independently, an oxygen atom or a bivalent hydrocarbon group. In those cases where Z represents a bivalent hydrocarbon group, examples of suitable groups include alkylene groups of 1 to 12, and preferably 1 to 10, carbon atoms, such as a methylene group, ethylene group or propylene group. Of these possibilities, an oxygen atom or ethylene group is preferred.

In the formula (1), n represents an integer of 10 or greater, and is preferably a number that yields a viscosity at 23° C. for the organopolysiloxane that is at least 25 mPa·s, even more preferably within a range from 100 to 1,000,000 mPa·s, and most preferably from 500 to 200,000 mPa·s.

[Component (B)]

The component (B) is a heat-conductive filler other than palladium powder, and is added in order to impart thermal conductivity to the composition of the present invention. The heat-conductive filler of the component (B) may use either a single material, or a combination of two or more different materials. Examples of the heat-conductive filler of the component (B) include one or more inorganic powders selected from the group consisting of aluminum oxide powder, titanium oxide powder, zinc oxide powder, quartz powder, silicon carbide powder, silicon nitride powder, magnesium oxide powder, aluminum hydroxide powder, aluminum nitride powder, boron nitride powder and graphite powder and the like; and/or one or more metal powders selected from the group consisting of aluminum powder, copper powder, silver powder, nickel powder, iron powder and stainless steel powder and the like. Preferred fillers include silver powder, copper powder, aluminum powder, aluminum oxide powder, titanium oxide powder, zinc oxide powder, aluminum hydroxide powder, boron nitride powder, and aluminum nitride powder.

The blend quantity of the heat-conductive filler of the component (B) is typically within a range from 10 to 4,000 parts by mass, and preferably from 20 to 3,000 parts by mass, per 100 parts by mass of the component (A). If the quantity of the component (B) is too low, then the thermal conductivity of the composition may be inadequate, whereas in contrast, if the quantity is too large, then mixing the component (B) with the other components may become difficult, and the viscosity of the resulting composition may become very high, causing a deterioration in the workability of the composition.

The average particle size of the heat-conductive filler of the component (B) is preferably not more than 100 μm, and is even more preferably within a range from 0.1 to 70 μm. If the average particle size exceeds 100 μm, then the dispersibility of the component (B) may worsen, and if the product composition is a liquid-type silicone rubber composition, then the component (B) may precipitate out of the composition upon standing. In the present invention, the average particle size can be determined as a volume-based cumulative average particle size, using a laser diffraction method.

The shape of the particles of the heat-conductive filler of the component (B) is preferably scale-like. The use of a heat-conductive filler in which the particles have a scale-like shape enables better suppression of increases in the hardness of the resulting cured product than those cases in which the particles of the heat-conductive filler have a spherical shape. Examples of this type of scale-like heat-conductive filler include the Stamp Aluminum powder series manufactured by Yamaishi Metals Co., Ltd., and the Aluminum Flake powder series manufactured by Toyo Aluminum K.K.

[Component (C)]

The component (C) is an organosilicon compound containing two or more hydrolyzable groups within each molecule, represented by a general formula (2) shown below:

$$R^3{}_b SiX_{4-b} \qquad (2)$$

(wherein, $R^3$ represents an unsubstituted or substituted monovalent hydrocarbon group that preferably contains from 1 to 10, and even more preferably 1 to 8, carbon atoms, X represents identical or different hydrolyzable groups, b represents 0, 1 or 2, and when b=2, the $R^3$ groups may be identical or different), and/or a partial hydrolysis-condensation product thereof. The component (C) is used as a curing agent within the composition of the present invention. The component (C) may use either a single compound, or a combination of two or more different compounds.

Specific examples of $R^3$ in the above formula (2) include a methyl group, ethyl group, propyl group, vinyl group or phenyl group.

Specific examples of the hydrolyzable groups X within the formula (2) include alkoxy groups such as a methoxy group, ethoxy group or butoxy group; ketoxime groups such as a dimethyl ketoxime group or methyl ethyl ketoxime group; acyloxy groups such as an acetoxy group; alkenyloxy groups such as an isopropenyloxy group or isobutenyloxy group; and amino groups such as an N-butylamino group or N,N-diethylamino group; and amide groups such as an N-methylacetamide group.

The blend quantity of the component (C) is typically within a range from 1 to 50 parts by mass, and is preferably from 3 to 20 parts by mass, per 100 parts by mass of the component (A). If the blend quantity is less than 1 part by mass, then achieving adequate cross-linking during curing of the product composition becomes difficult, meaning a cured product with the intended level of rubber-like elasticity may be unobtainable. If the blend quantity exceeds 50 parts by mass, then not only is the product composition prone to a large degree of shrinkage upon curing, but the obtained cured product also tends to exhibit inferior mechanical properties.

[Component (D)]

The palladium powder of the component (D) is added to the composition of the present invention to suppress the quantity of hydrogen gas generated from the heat-conductive filler of the component (B), and improve the storage properties of the composition. The component (D) may use either a single powder, or a combination of two or more powders with different average particle sizes or particle shapes.

The average particle size of the palladium powder of the component (D) is preferably not more than 10 μm, is even more preferably within a range from 0.01 to 10 μm, and is most preferably from 0.1 to 5 μm. If the average particle size exceeds 10 μm, then the dispersibility of the component (D) worsens, and if the product composition is a liquid-type silicone rubber composition, then the component (D) may precipitate out of the composition upon standing.

The blend quantity of the component (D) is typically within a range from 0.01 to 1 part by mass, and preferably from 0.01 to 0.5 parts by mass, per 100 parts by mass of the heat-conductive filler of the component (B). In other words, the quantity is typically within a range from 0.001 to 40 parts by mass, and preferably from 0.001 to 20 parts by mass, per 100 parts by mass of the component (A). If this blend quantity is too small, then the effect of the component (D) in suppressing hydrogen gas may be inadequate. In contrast, if the blend quantity is too large, then no further improvement in the hydrogen gas suppression effect is achieved by increasing the blend quantity, and the composition may become economically unviable.

[Curing Catalyst Component]

The silicone rubber composition of the present invention is a condensation-curable composition, and if required, a curing catalyst may be used in this type of condensation-curable silicone rubber composition. Examples of suitable curing catalysts include alkyl tin ester compounds such as dibutyltin diacetate, dibutyltin dilaurate and dibutyltin dioctoate; titanate esters and titanium chelate compounds such as tetraisopropoxy titanium, tetra-n-butoxy titanium, tetrakis(2-ethylhexoxy) titanium, dipropoxybis(acetylacetonato) titanium, and titanium isopropoxyoctylene glycol; organometal compounds such as zinc naphthenate, zinc stearate, zinc 2-ethyloctoate, iron 2-ethylhexoate, cobalt 2-ethylhexoate, manganese 2-ethylhexoate, cobalt naphthenate, and alkoxy aluminum compounds; aminoalkyl-substituted alkoxysilanes such as 3-aminopropyltriethoxysilane and N-β-(aminoethyl)-γ-aminopropyltrimethoxysilane; amine compounds and salts thereof such as hexylamine and dodecylamine phosphate; quaternary ammonium salts such as benzyltriethylammonium acetate; lower fatty acid salts of alkali metals such as potassium acetate, sodium acetate and lithium oxalate; dialkylhydroxylamines such as dimethylhydroxylamine and diethylhydroxylamine; and guanidyl group-containing silanes and siloxanes such as tetramethylguanidylpropyltrimethoxysilane, tetramethylguanidylpropylmethyldimethoxysilane and tetramethylguanidylpropyltris(trimethylsiloxy)silane. These curing catalysts may be used either alone, or in combinations of two or more different catalysts. The blend quantity of the curing catalyst is preferably within a range from 0 to 10 parts by mass, and preferably from 0.01 to 5 parts by mass, per 100 parts by mass of the component (A).

[Filler Component]

Various other fillers may be added to the room temperature-curable, heat-conductive silicone rubber composition of the present invention according to need. Examples of these types of fillers include metal oxides such as fumed silica, precipitated silica, diatomaceous earth, iron oxide, and titanium oxide; metal carbonates such as calcium carbonate powder, magnesium carbonate powder and zinc carbonate powder; glass wool; carbon black; fine mica powder; fused silica powder; and powders of synthetic resins such as polystyrene, polyvinyl chloride and polypropylene. The quantity of these fillers is arbitrary, provided the quantity added does not impair the effects of the present invention. Furthermore, when these types of fillers are used, they are preferably first subjected to a drying treatment to remove any moisture.

[Additives, Adhesion Assistants]

Furthermore, if required, additives including pigments; dyes; age resistors; antioxidants; antistatic agents; flame retardants such as antimony oxide or paraffin chloride; thixotropic improvers such as polyethers; moldproofing agents; and antibacterial agents may also be added to the room temperature-curable, heat-conductive silicone rubber composition of the present invention. Moreover, if necessary, adhesion assistants including aminosilanes such as γ-aminopropyltriethoxysilane or 3-(2-aminoethylamino)propyltrimethoxysilane; and epoxysilanes such as γ-glycidoxypropyltrimethoxysilane or β-(3,4-epoxycyclohexyl)ethyltrimethoxysilane may also be added to the composition.

[Room Temperature-Curable, Heat-Conductive Silicone Rubber Composition]

A room temperature-curable, heat-conductive silicone rubber composition of the present invention is obtained by uniformly mixing the components (A) to (D) described above, together with any optional curing catalysts, fillers, additives or adhesion assistants, within a dry atmosphere. The composition of the present invention obtained in this manner exhibits excellent storage properties. Accordingly, the composition of the present invention can be used favorably as a one-part type composition. Furthermore, the composition of the present invention may also be prepared and stored as two or more separate liquids, in a similar manner to typical curable silicone rubber compositions, and is then cured by mixing the liquids together prior to use. In this manner, there are no particular restrictions on the configuration of the composition of the present invention, with both one-part type and two-part type configurations being suitable, although from the viewpoint of workability at the time of use, a one-part type composition is preferred.

The room temperature-curable, heat-conductive silicone rubber composition of the present invention is stable in a sealed state, but when exposed to air, undergoes rapid curing as a result of the humidity within the air. Consequently, a cured product can be obtained by applying the composition of the present invention to a substrate appropriate to the intended application, and then curing the composition at room temperature. Furthermore, if required a hydrocarbon-based solvent such as toluene or petroleum ether, or a ketone or ester or the like may be added to the composition as a diluent.

[Applications]

A cured product of a composition of the present invention can be used favorably, for example, as a heat-conductive material for a heat-generating electronic component. This enables the electronic component to be cooled effectively. For example, the composition of the present invention can be applied to the electronic component and then cured at room temperature, thereby forming a cured product on top of the electronic component. By bringing the surface of the cured product that does not contact the electronic component into contact with a heat-dissipating member such as a heat sink, heat can be conducted effectively away from the electronic component, through the cured product, and into the heat-dissipating member. Examples of the heat-generating electronic component include power transistors; thyristors; integrated circuit elements such as LSI and CPU; and GPU (graphics processing unit). Furthermore, a cured product of the composition of the present invention may also be molded into a film or sheet prior to use.

EXAMPLES

As follows is a description of specifics of the present invention using a series of examples and comparative examples, although the present invention is not limited by the examples presented below. Viscosity values refer to values measured at 23° C.

Examples 1 to 3, Comparative Examples 1 and 2

A dimethylpolysiloxane with both molecular chain terminals blocked with hydroxyl groups and with a viscosity of 5,000 mPa·s as the component (A), an aluminum powder YP-580 (a product name, manufactured by Yamaishi Metals Co., Ltd., sieved through 200 mesh, shape: scale-like) as the component (B), phenyltri(isopropenyloxy)silane as the component (C), a palladium powder (manufactured by Furuya Metal Co., Ltd., average particle size: 2.5 μm, shape: amorphous) as the component (D), 0.8 parts by mass of 1,1,3,3-tetramethyl-2-[3-(trimethoxsilyl)propyl]guanidine as a curing catalyst component, and 1 part by mass of 3-aminopropyltriethoxysilane as an adhesion assistant were mixed together in an anhydrous state, yielding a low-viscosity, heat-conductive silicone rubber composition. The blend quantities for the components (A) to (D) are shown in Table 1.

[Hardness]

Each of these compositions was used to prepare a sheet of thickness 6 mm, by curing the composition for 7 days in an atmosphere at 23±2° C. and 50±5% RH. The durometer type A hardness of each sheet was measured in accordance with JIS K 6249. The results are shown in Table 1.

[Thermal Conductivity]

Furthermore, each of the compositions was also used to prepare a block with a height of 12 mm, by curing the composition for 14 days in an atmosphere at 23±2° C. and 50±5% RH. The thermal conductivity of each block was then measured using a thermal conductivity meter (product name: Kemtherm QTM-D3 Rapid Thermal Conductivity Meter, manufactured by Kyoto Electronics Manufacturing Co., Ltd.). The results are shown in Table 1.

[Storage Stability]

Each composition was placed in a 100 cc metal tube (specifically, an aluminum tube), was stored for 7 days at 70° C., and the metal tube was then inspected for signs of swelling. If swelling of the metal tube was noticeable, then the storage stability was evaluated as poor (x). If no change was seen in the metal tube, the storage stability was evaluated as good (O). The results are shown in Table 1.

TABLE 1

|  |  | Example 1 | Example 2 | Example 3 | Comparative example 1 | Comparative example 2 |
|---|---|---|---|---|---|---|
| Component (parts by mass) | Component (A) | 100 | 100 | 100 | 100 | 100 |
|  | Component (B) | 20 | 50 | 500 | 50 | 0 |
|  | Component (C) | 10 | 10 | 10 | 10 | 10 |
|  | Component (D) | 0.01 | 0.1 | 2 | 0 | 0 |
|  | Curing catalyst component | 0.8 | 0.8 | 0.8 | 0.8 | 0.8 |
|  | Adhesion assistant component | 1 | 1 | 1 | 1 | 1 |
| Properties | Hardness (durometer type A) | 32 | 41 | 65 | 40 | 18 |
|  | Thermal conductivity (W/m·K) | 0.6 | 1.0 | 3.0 | 1.0 | 0.2 |
|  | Storage stability | ○ | ○ | ○ | x | ○ |

Examples 4 to 6, Comparative Examples 3 and 4

A dimethylpolysiloxane with both molecular chain terminals blocked with trimethoxy groups and with a viscosity of 900 mPa·s as the component (A), an aluminum powder YP-580 (as described above) as the component (B), methyltrimethoxysilane as the component (C), a palladium powder (manufactured by Furuya Metal Co., Ltd., average particle size: 2.5 μm, shape: amorphous) as the component (D), 2 parts by mass of a titanium chelate catalyst Orgatix TC-750 (a product name, manufactured by Matsumoto Trading Co., Ltd.) as a curing catalyst component, and 0.2 parts by mass of 3-aminopropyltriethoxysilane as an adhesion assistant were mixed together in an anhydrous state, yielding a low-viscosity, heat-conductive silicone rubber composition. The blend quantities for the components (A) to (D) are shown in Table 2.

These compositions were measured for hardness and thermal conductivity, and evaluated for storage stability, using the same methods as those described above. The results are shown in Table 2.

TABLE 2

|  |  | Example 4 | Example 5 | Example 6 | Comparative example 3 | Comparative example 4 |
|---|---|---|---|---|---|---|
| Component (parts by mass) | Component (A) | 100 | 100 | 100 | 100 | 100 |
|  | Component (B) | 20 | 50 | 500 | 50 | 0 |
|  | Component (C) | 7 | 7 | 7 | 7 | 7 |
|  | Component (D) | 0.01 | 0.1 | 2 | 0 | 0 |
|  | Curing catalyst component | 2 | 2 | 2 | 2 | 2 |
|  | Adhesion assistant component | 0.2 | 0.2 | 0.2 | 0.2 | 0.2 |
| Properties | Hardness (durometer type A) | 33 | 45 | 74 | 44 | 23 |
|  | Thermal conductivity (W/m·K) | 0.6 | 1.0 | 3.0 | 1.0 | 0.2 |
|  | Storage stability | ○ | ○ | ○ | x | ○ |

What is claimed is:

1. A room temperature-curable, heat-conductive silicone rubber composition, comprising:

(A) 100 parts by mass of an organopolysiloxane represented by a general formula (1) shown below:

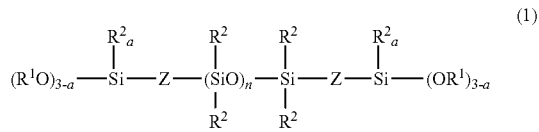

(1)

wherein, each $R^1$ represents, independently, a hydrogen atom, or an unsubstituted or substituted monovalent hydrocarbon group, $R^2$ represents identical or different, unsubstituted or substituted monovalent hydrocarbon groups, each Z represents, independently, an oxygen atom or a bivalent hydrocarbon group, a represents 0, 1 or 2, and n represents an integer of 10 or greater, (B) 10 to 4,000 parts by mass of aluminum powder,
    (C) 1 to 50 parts by mass of an organosilicon compound represented by a general formula (2) shown below:

$$R^3{}_b SiX_{4-b} \qquad (2)$$

(wherein, $R^3$ represents an unsubstituted or substituted monovalent hydrocarbon group, X represents identical or different hydrolyzable groups, b represents 0, 1 or 2, and when b=2, the $R^3$ groups may be identical or different, and/or a partial hydrolysis-condensation product thereof, and (D) 0.01 to 1.0 parts by mass of a palladium powder per 100 parts by mass of the aluminum powder.

2. The room temperature-curable, heat-conductive silicone rubber composition according to claim 1, wherein the composition is a one-part type composition.

3. The room temperature-curable, heat conductive silicone rubber composition according to claim 1, wherein $R^1$ of formula (1) is hydrogen.

4. The room temperature-curable, heat conductive silicone rubber composition according to claim 1, wherein the shape of particles of the aluminum powder is scale-like.

5. The room temperature-curable, heat conductive silicone rubber composition according to claim 1, wherein $R^2$ of formula (1) is methyl.

6. The room temperature-curable, heat conductive silicone rubber composition according to claim 1, wherein Z of formula (1) is oxygen or ethylene.

7. The room temperature-curable, heat conductive silicone rubber composition according to claim 1, wherein a viscosity at 23° C. of the organopolysiloxane represented by the general formula (1) is in a range from 500 to 200,000 mPa·s.

8. The room temperature-curable, heat conductive silicone rubber composition according to claim 1, wherein an average particle size of the aluminum powder is in the range from 0.1 to 70 μm.

9. The room temperature-curable, heat conductive silicone rubber according to claim 4, wherein an average particle size of the aluminum powder is in the range from 0.1 to 70 μm.

10. The room temperature-curable, heat conductive silicone rubber composition according to claim 1, further comprising at least one filler selected from the group consisting of a metal oxide, a metal carbonate, glass wool, carbon black, fine mica powder, fused silica powder and a powder of a synthetic resin.

11. The room temperature-curable, heat conductive silicone rubber composition according to claim 1, further comprising an additive selected from the group consisting of an adhesion assistant, a pigment, a dye, an age resistor, an antioxidant, an antistatic agent, a flame retardant, a thixotropic improver, and an antibacterial agent.

12. A cured product obtained by curing the composition according to claim 1.

13. A method for conducting heat away from a heat-generating electronic component to a heat-dissipating member, comprising sandwiching the cured product according to claim 12 between the heat-generating electronic component and the heat-dissipating member.

14. An electronic device comprising:
a heat-generating electronic component,
a heat-dissipating member, and
the cured product according to claim 12 wherein the cured product is sandwiched between the heat-generating electronic component and the heat-dissipating member.

* * * * *